Patented Oct. 29, 1940

2,219,741

UNITED STATES PATENT OFFICE 2,219,741

MANUFACTURE OF WATER-SOLUBLE DOUBLE SALTS OF PURINE DERIVATIVES

Ferdinand Hoffmann, Hohen-Neuendorf, near Berlin, Germany, assignor to Byk-Guldenwerke Chemische Fabrik Aktiengesellschaft, Berlin, Germany, a corporation of Germany No Drawing. Application April 11, 1938, Serial No. 201,327. In Germany November 24, 1937

2 Claims. (Cl. 260—253)

This invention relates to manufacture of water-soluble double salts of purine derivatives; and it comprises a method of making certain therapeutically active double salts wherein an alkylated 2,6-dihydroxypurine, or one of its compounds with a low molecular diamine or a hydroxyamine, is reacted with a camphor acid, such as camphoric acid or a camphosulfonic acid, under conditions producing salt formation. The invention also includes the novel double salts produced by the said reaction, these salts being reaction products of the compounds stated, being water soluble and having a diuretic action without producing the undesired physiological effects of the purine bases; all as more fully hereinafter set forth and as claimed.

Several water soluble purine compounds have already been produced and described in the literature. Most of these compounds, however, have the same blood-pressure-lowering effect as the purine bases, as well as causing such effects as vomiting, fever, etc. All of these prior compounds, moreover, have had a basic reaction, which is disadvantageous. Upon neutralization of these compounds the purines are precipitated.

It has been found that alkylated 2,6-dihydroxypurines in general, as well as certain derivatives of these compounds, can be reacted with camphor acids, such as camphoric and camphosulfonic acids, for example, with the production of well-defined double salts which in all cases differ in their properties from the starting materials. These compounds are free from the aforesaid undesired physiological effects of the purine bases. They have the further advantage that the bitter taste of the purine bases is practically eliminated. In addition, these compounds can be obtained, in accordance with the molecular proportions of the reacting components employed, in the form of neutral, acid- or alkaline reacting double salts. The molecular structure of these double salts is unknown.

Examples of the alkylated 2,6-dihydroxypurines which can be employed in this invention are caffeine, theobromine and theophylline. However, all compounds of this general class, having 1 to 3 low-molecular alkyl groups, are operative. Moreover these compounds can be reacted with low-molecular diamines and hydroxyamines in general, to form intermediate derivatives which are useful in this invention. Ethylene diamine and piperazine (diethylene diamine) are examples of low molecular diamines which can be used in this manner. Ethylene diamine and theophylline, for example, form the known compound theophylline ethylene diamine. Among the hydroxyamines which are useful are the low-molecular alkylol amines, such as mono-, di- and tri-ethanolamines. The intermediate derivatives, which are formed by reacting purine compounds with low-molecular diamines and hydroxyamines, can be reacted with the camphor acids, which have been mentioned, to form the double salts of this invention.

The chemical reaction, which is required to produce the desired double salts of this invention, can be conducted at ordinary temperatures or at temperatures above or below room temperature. The reaction components may be dissolved in a common inert solvent or only one of the reactants may be dissolved, the other being suspended in the solution. It is also possible to carry out the reaction when using the camphosulfonic acids, substantially in the absence of solvents by rubbing the dry reactants together in a mortar. But the addition of a small amount of solvent speeds up the reaction and the reaction products are then substantially free from unreacted material. Water and alcohol are examples of solvents which may be employed. The reaction in question takes place in molecular proportions and substantially quantitatively. For example, it is possible to use 1, 2 or 3 moles of the camphor acid to one mole of the purine compound. When an inert solvent is employed, this may be removed by evaporation, under ordinary or reduced pressures. The double salts which are recovered can be readily purified by recrystallization.

The following specific examples represent preferred embodiments of the present invention. These examples illustrate how the present process can be conducted in actual practice to produce the novel products of this invention.

Example 1

Caffeine and campho-$\pi$-sulfonic acid were thoroughly mixed by grinding them together, in the molecular proportions of 1 mole to 2 moles, respectively. It was found that a chemical reaction took place even without the addition of a solvent to the mixture, this reaction being substantially quantitative.

Example 2

Caffeine and campho-$\pi$-sulfonic acid were again mixed together in the same proportions used in Example 1. A small amount of alcohol was added to the reaction mixture and it was found that the resulting chemical reaction took place more quickly and somewhat more completely than the reaction in Example 1. The alcohol was removed by evaporation over the water bath and the double salt was recrystallized from its aqueous solution.

*Example 3*

Camphoric acid was dissolved in water. An equi-molecular proportion of finely divided theophylline was then added in small proportions, the solution being agitated between additions until the solution became clear. The theophylline, which was kept in suspension by the agitation, soon reacted with the camphoric acid and dissolved in the aqueous solution. The water was removed by evaporation under reduced pressure.

*Example 4*

Equi-molecular proportions of theophylline and campho-7-sulfonic acid were mixed together in the presence of a small amount of water. The resulting magma was then heated to remove the water, leaving the desired double salt.

While the present invention has been illustrated by what is believed to be the best embodiments thereof, it is evident that various modifications can be made in the compounds employed and in the specific procedures set out without departing from the purview of this invention. For example, various substitution and addition products of the compounds disclosed are operative without essential change in the methods described or in the properties of the compounds produced. It has been found, for example, that the known additive product of theobromin with sodium salicylate can be reacted with camphor acids with the production of double salts having the desired physical and therapeutic properties. While the specific purine compounds which have been mentioned are all methylated compounds, it has been found that the similar compounds, in which the methyl groups are replaced by other low-molecular alkyl groups, are equally operative. It is also possible to employ halogen and other derivatives of the compounds disclosed. These and other modifications of this invention, which would be obvious to those skilled in the art, are included within the scope of this invention and the terms of the following claims.

What is claimed is:

1. As a new product, the water-soluble double salt of camphosulfonic acid and theophylline; the said double salt having a diuretic action without producing the undesired physiological effects of the purine bases and being free from extraneous alkalis.

2. As new products, water-soluble double salts of camphosulfonic acid and a purine compound, selected from a group consisting of theophylline and theophylline ethylene diamine; the said double salts having a diuretic action without producing the undesired physiological effects of the purine bases and being free from extraneous alkalis.

FERD. HOFFMANN.